(12) United States Patent
Obrador et al.

(10) Patent No.: US 8,411,902 B2
(45) Date of Patent: Apr. 2, 2013

(54) PROVIDING A VISUAL INDICATION OF THE CONTENT OF A VIDEO BY ANALYZING A LIKELY USER INTENT

(75) Inventors: Pere Obrador, Mountain View, CA (US); Qian Lin, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2354 days.

(21) Appl. No.: 10/819,612

(22) Filed: Apr. 7, 2004

(65) Prior Publication Data

US 2005/0231602 A1   Oct. 20, 2005

(51) Int. Cl.
*G06K 9/00* (2006.01)
(52) U.S. Cl. ....................................... 382/107
(58) Field of Classification Search ............... 382/107
See application file for complete search history.

(56) References Cited

U.S. PATENT DOCUMENTS

| | | | | |
|---|---|---|---|---|
| 5,532,833 A | * | 7/1996 | Hong et al. ........... | 707/E17.028 |
| 5,995,095 A | * | 11/1999 | Ratakonda ............. | 715/255 |
| 6,125,229 A | * | 9/2000 | Dimitrova et al. ..... | 386/69 |
| 6,137,544 A | * | 10/2000 | Dimitrova et al. ..... | 348/700 |
| 6,298,145 B1 | * | 10/2001 | Zhang et al. ......... | 382/103 |
| 6,549,643 B1 | * | 4/2003 | Toklu et al. .......... | 382/107 |
| 6,697,523 B1 | * | 2/2004 | Divakaran et al. ..... | 382/173 |
| 7,016,540 B1 | * | 3/2006 | Gong et al. .......... | 382/225 |
| 7,298,930 B1 | * | 11/2007 | Erol et al. ........... | 382/305 |
| 2001/0016007 A1 | * | 8/2001 | Wu et al. ............. | 375/240.16 |
| 2002/0051077 A1 | * | 5/2002 | Liou et al. ........... | 348/465 |
| 2003/0068087 A1 | * | 4/2003 | Wu et al. ............. | 382/190 |
| 2003/0210886 A1 | * | 11/2003 | Li et al. .............. | 386/46 |
| 2004/0054964 A1 | * | 3/2004 | Bozdagi et al. ........ | 715/500.1 |
| 2005/0044499 A1 | * | 2/2005 | Allen et al. .......... | 715/719 |
| 2007/0237225 A1 | * | 10/2007 | Luo et al. ............ | 375/240.12 |

OTHER PUBLICATIONS

Gelgon, M., et al: "Determining a Structured Spatio-Temporal ..."; Computer Vision—ECCV Conf.; 1998; pp. 595-609; vol. 1; Springer-Verlag, Berlin; XP-002334254.

Bouthemy, Patrick. et al.: "A Unified Approach to Shot Change ..."; IEEE; Oct. 1999; pp. 1020-1044; vol. 9; IEEE Transactions on Circuits and Systems; XP-000853337.

Ardizzone, E., et al.: Motion and Color-Based Video Indexing and Retrieval; Proceedings of International Conf.; Aug. 1996; pp. 136-138; vol. 3; Palermo, Italy; XP-001038.

* cited by examiner

Primary Examiner — John Strege (57) ABSTRACT

A method for providing a visual indication of a content of a video that reflects a likely intent of a user that acquired the video. The present method enables repurposing of a video into a variety of output forms that are adapted to the likely intent of the user and enables more efficient browsing of a stored video.

21 Claims, 6 Drawing Sheets

| | |
|---|---|
| Index A | Panoramic Output 100 |
| Index B | Panoramic Output 100 |
| Index C | Flipbook Output 102 |
| Index D | Flipbook Output 102 |
| Index E | Flipbook Output 102 |
| Index F | Photographic Output 104 |
| Index G | Flipbook Output 106 |
| Index H | Flipbook Output 106 |
| Index I | Photographic Output 108 |
| Index J | Panoramic Output 112 |
| Index K | Panoramic Output 112 |
| Index L | Photographic Output 114 |

FIG. 12

PROVIDING A VISUAL INDICATION OF THE CONTENT OF A VIDEO BY ANALYZING A LIKELY USER INTENT

BACKGROUND

A wide variety of video systems may include the capability of generating, acquiring, or storing a video. Examples of video systems include video cameras, computer systems, home video appliances, PDAs, digital phones, etc. For example, a video camera may include mechanism for acquiring a video and storing the video on an storage media. In another example, a computer system may include the capability of obtaining a video from an attached camera, recording device, or some other video source, and storing the video locally.

A video system may include a mechanism for providing an indication of the content of a stored video. For example, a video camera or a computer system may include a display and rendering hardware for generating a playback of a stored video. In another example, a video appliance may include a display and a mechanism for rendering descriptive information, e.g. titles, file names, length of a video, data/time a video was acquired, etc. pertaining to a stored video. In another example, a video system may include a display and a mechanism for generating thumbnail images that depict portions of a stored video.

Unfortunately, the mechanisms in prior video systems for providing an indication of the content of a stored video may not reflect an intent of a user that acquired the video. For example, descriptive information such as file names, date/time, etc., or thumbnail images randomly generated may not reflect the content in the video that was of interest to a user that acquired a video. As a consequence, a user of a video system may have to engage in a time consuming manual review of the entire content of a stored video in order to obtain useful evaluation on its content.

SUMMARY OF THE INVENTION

A method is disclosed for providing a visual indication of a content of a video that reflects a likely intent of a user that acquired the video. The present method enables repurposing of a video into a variety of output forms that are adapted to the likely intent of the user and enables more efficient browsing of a stored video.

A video system according to the present techniques includes a processor that determines a likely intent of a user that captured a video by detecting at least one motion type in the video. The processor repurposes the video by generating a visual output that is adapted to the motion type. A video system according to the present techniques may also include a video index store for holding indices to video frames in the video.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
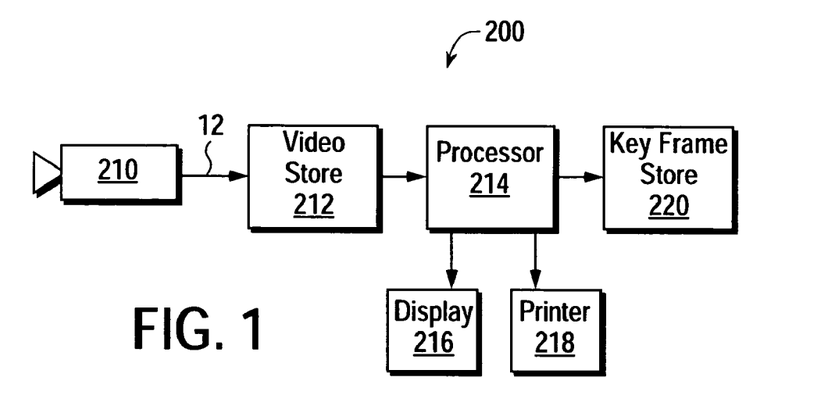
FIG. 1 shows a video system that incorporates the present techniques.

FIG. 1 shows a video system 200 that incorporates the present techniques. The video system 200 includes a video camera 210, a video store 212, a processor 214, a display 216, a printer 218, and a key frame store 220. The video camera 210 generates a video 12 that includes a series of video frames acquired by the video camera 210 under control of a user of the video camera 210. The video 12 may be stored in video store 212 and/or provided directly to the processor 214.

The processor 214 repurposes the video 12 by generating a visual output that indicates a content of the video 12. The visual output reflects a likely intent of a user that acquired the video 12. The processor 214 renders the visual output using the display 216 and/or the printer 218.

The processor 214 generates a visual output that indicates a content in the video 12 by first detecting a motion type in the video 12 that may indicate an intent of a user that captured the video 12. Examples of motion types that may indicate an intent of a user include a panning motion type, a zoom in motion type, an object motion type, a still motion type, i.e. no motion, and a complex motion type.

For example, a panning motion type in the video 12 may indicate that the user of the video camera 210 that captured the video 12 had intended to capture a panorama using a panning movement of the video camera 210. In response to a detected panning motion type in the video 12, the processor 214 may generate a panoramic output using a portion of the video 12 that corresponds to the panning motion type. The processor 214 may render the panoramic output using the display 216 or the printer 218.

In another example, a zoom in motion type in the video 12 may indicate that the user of the video camera 210 had intended to capture a close up of an object of interest by zooming the video camera 210 into the object of interest and then holding the video camera 210 relatively still on the object of interest. In response to a detected zoom in motion type followed by a still motion type, the processor 214 may generate a photographic output using a portion of the video 12 that corresponds to the still motion type. The processor 214 may render the photographic output that depicts the object of interest using the display 216 or the printer 218.

In yet another example, a still motion type in the video 12 may indicate that the user of the video camera 210 had intended to capture an area of interest in a scene by holding the video camera 210 relatively still on the area. In response to a detected still motion type, the processor 214 may generate a photographic output using a portion of the video 12 that corresponds to the still motion type. The processor 214 may render the photographic output that depicts the area of interest using the display 216 or the printer 218.

In another example, an object motion type in the video 12 may indicate that the user of the video camera 210 had intended to capture a moving object of interest. In response to a detected object motion type, the processor 214 may generate a flipbook output or slideshow output using portions of the video 12 that correspond to the object motion type. The processor 214 may render the slideshow output using the display 216 or render the flipbook output using the printer 218.

The processor 214 detects a motion type in the video 12 by analyzing a relative motion among a series of video frames of the video 12. The processor 214 may determine a relative motion among the video frames in the video 12 using a block-based motion analysis such as that associated with MPEG 1 encoding. If the video system 200 is implemented in a system that already includes MPEG functionality then the processor 214 may share available MPEG hardware and/or code.

Figure 2A:
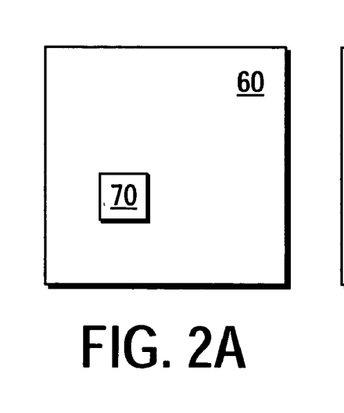
FIG. 2*a*-2*c* illustrate a method for determining a relative motion among a pair of adjacent video frames in a video.
Figure 2B:
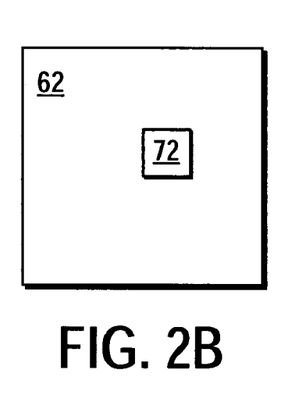
Figure 2C:
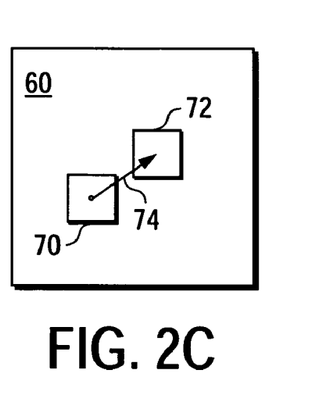

FIG. 2a-2c illustrate one method that may be employed by the processor 214 to determine a relative motion among a pair of adjacent video frames 60-62 in the video 12. The processor 214 compares the pixel content of the video frames 60 and 62 and determines that a block 70 of the video frame 60 is substantially similar to a block 72 in the video frame 62. For example, the processor 214 may determine a correlation metric between the blocks 70 and 72 based on the pixel data values in the blocks 70 and 72 to determine the similarity.

The processor 214 generates a motion vector 74 that indicates a spatial relationship between the blocks 70 and 72 based on the video frame 60 as a reference frame. The processor 214 generates a set of motion vectors for the video frames 60-62, each motion vector corresponding to a block of the reference video frame 60.

The processor 214 examines an arrangement of the motion vectors for pairs of adjacent video frames in the video 12 to detect a motion type. For example, an arrangement of the motion vectors for a pair of adjacent video frames may indicate a panning motion type, a zooming motion type (in/out), an object motion type, a still motion type, or a complex motion type. The motion vectors may be calculated over a number of video frames rather than a pair of adjacent video frames.

Figure 3:
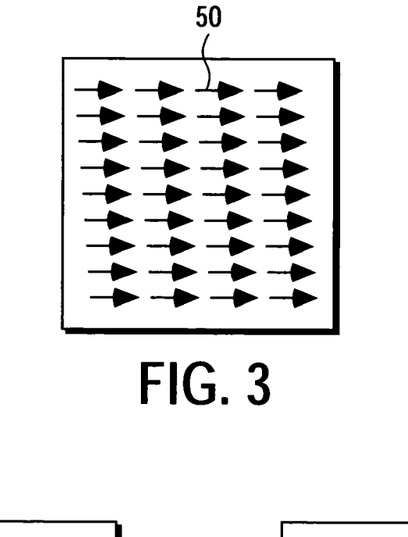
FIG. 3 illustrates an arrangement of motion vectors that indicate a panning motion type.

FIG. 3 illustrates an arrangement of motion vectors 50 for a pair of adjacent video frames in the video 12 that indicate that the video camera 210 was panning while the adjacent video frames were being captured. The magnitudes and directions of the motion vectors 50 depict a relatively consistent and uniform pattern as the video camera 210 was moved to the right during video capture. The processor 214 recognizes an arrangement exemplified by the motion vectors 50 to detect a panning motion type in the video 12.

Figure 4:
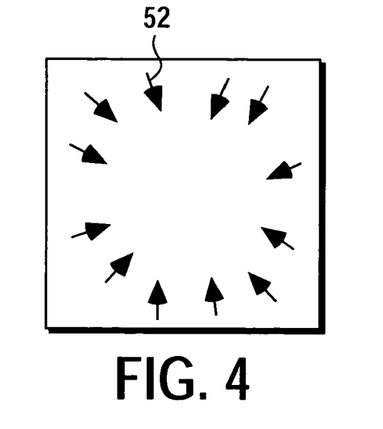
FIG. 4 shows an arrangement of motion vectors that indicate a zooming out motion type.

FIG. 4 shows an arrangement of motion vectors 52 for a pair of adjacent video frames in the video 12 that indicate that the video camera 210 was zooming out while the adjacent video frames were being captured. The directions of the motion vectors 52 point to the center of a video frame as the video camera 210 zooms out. The processor 214 recognizes an arrangement exemplified by the motion vectors 52 to detect a zoom out motion type in the video 12.

Figure 5:
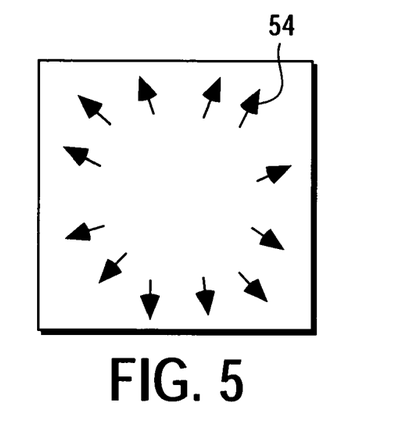
FIG. 5 shows an arrangement of motion vectors that indicate a zoom in motion type.

FIG. 5 shows an arrangement of motion vectors 54 for a pair of adjacent video frames in the video 12 that indicate that the video camera 210 was zooming in while the adjacent video frames were being captured. The directions of the motion vectors 54 point away from the center of a video frame as the video camera 210 zooms in. The processor 214 recognizes an arrangement exemplified by the motion vectors 54 to detect a zoom in motion type in the video 12.

Figure 6:
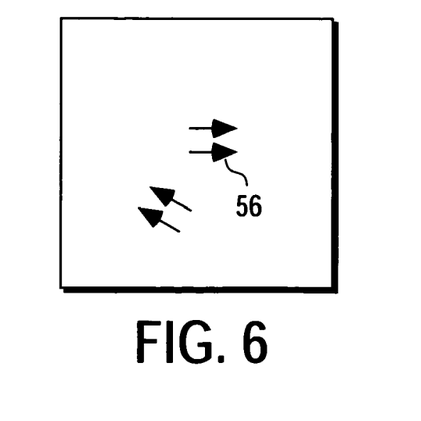
FIG. 6 shows an arrangement of motion vectors that indicate an object motion type.

FIG. 6 shows an example arrangement of motion vectors 56 for a pair of adjacent video frames in the video 12 that indicate the presence of moving objects. The magnitudes and directions of the motion vectors 56 vary locally as objects move within the video 12. The processor 214 recognizes an arrangement of the motion vectors that vary locally to detect an object motion type in the video 12.

A set of motion vectors for a pair of adjacent video frames in the video 12 having magnitudes close to zero and the overall vector average of zero indicate that the video camera 210 was relatively still while the adjacent video frames were being captured. The processor 214 recognizes a set of near zero magnitude motion vectors to detect a still motion type in the video 12.

A set of motion vectors for a pair of adjacent video frames in the video 12 having a complex arrangement of directions and magnitudes may indicate a complex motion type. One example of a complex motion type is a panning movement of the video camera 210 while objects move in a captured image scene. Another example of a complex motion type is a movement of one or more objects in a captured image scene when the video camera 210 is relatively still.

The processor 214 may determine an intent of a user of the video camera 210 by analyzing the velocity and/or changes in the velocity of a panning motion type in the video 12. The processor 214 may determine a velocity of a panning motion type in response to the rate of acquired video frames in the video 12 and the relative motion between successive video frames. For example, a set of motion vectors for a pair of adjacent video frames that indicate a panning motion type and that have a relatively large magnitude indicate a relatively high velocity whereas a set of motion vectors that indicate a panning motion type and that have a relatively small magnitude indicate a relatively low velocity.

If the velocity of a panning motion type is relatively slow and steady then it may be inferred that the user of the video camera 210 was intending to acquire a panorama. On the other hand, if the velocity of a panning motion type is relatively fast then it may be inferred that the user of the video camera 210 was intending to quickly move to an area or object of interest and that the user had little or no interest in the intervening areas. A relatively fast panning movement may be regarded as the equivalent of switching off image acquisition, moving the video camera 210 to the area or object of interest, then switching on image acquisition.

For example, the processor 214 may determine an intent to acquire a panorama by detecting a panning motion type in the video 12 for a period of time ($T_s$) during which the velocity in the panning motion is relatively constant. The period $T_s$ may be bounded by an initial video frame ($F_i$) and a final video frame ($F_f$) in the video 12. The processor 214 may record indices for the video frames $F_i$ and $F_f$ in the key frame store 220. The processor 214 may use the video frames $F_i$ and $F_f$ to generate the a panoramic output. For example, the processor 214 may use the video frames $F_i$ and $F_f$ as well as the intervening frames between the video frames $F_i$ and $F_f$ to generate a panoramic output.

The processor 214 may generate a panoramic output by stitching together the video frames $F_i$ through $F_f$ in a known manner. For example, the processor 214 may determine motion vectors that indicate the relative spatial offset among adjacent video frames and then determine the overlapping areas of adjacent image frames in response to the motion vectors, and then combine the adjacent video frames so as to exclude the overlapping areas from the combination.

Figure 7:
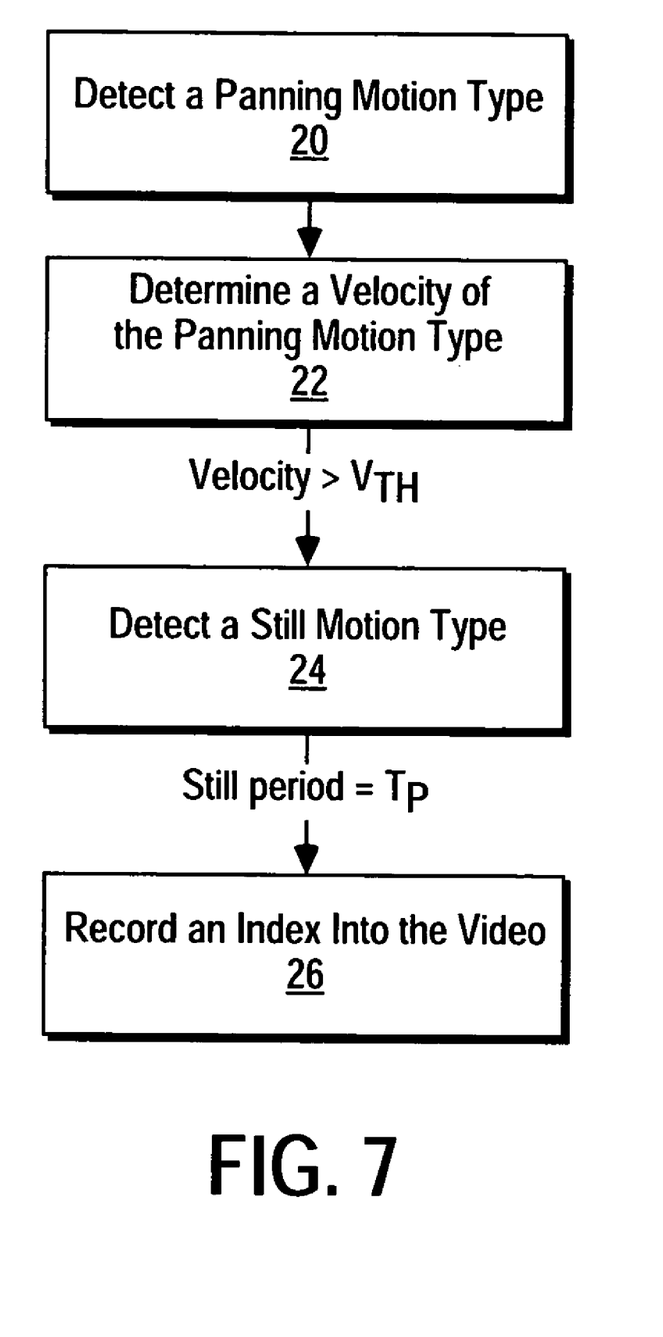
FIG. 7 shows an embodiment of a method for determining an intent by a user of a video camera to acquire an area or object of interest.

FIG. 7 shows an embodiment of a method for determining an intent by a user of the video camera 210 to acquire an area or object of interest. At step 20, the processor 214 detects a panning motion type in the video 12.

At step 22, the processor 214 repeatedly determines a velocity of the panning motion type in response to the rate of acquired video frames and the relative motion between adjacent video frames throughout the duration of the panning motion type. If the velocity of the panning motion type exceeds a predetermined threshold ($V_{TH}$) then the processor 214 at step 24 detects when a velocity of the panning motion type reduces to a relatively stable still motion type. If the still motion type is then maintained for a predetermined time period ($T_P$) the processor 214 at step 26 records an index to a video frame in the video 12.

The index recorded into the key frame store 220 at step 26 corresponds to a video frame of the video 12 that may have contained an area or object of interest to the user of the video camera 210. The index recorded at step 26 corresponds to a video frame contained in the time period $T_p$. The processor 214 may then use the index recorded at step 26 to obtain a video frame from the video frame store 212 and then use the obtained video frame to generate a photographic output or a thumbnail output.

The processor 214 may determine an intent of a user of the video camera 210 by detecting a zoom in motion type. For example, a user of the video camera 210 may zoom in to obtain more detail of a particular object of interest. If a zoom in motion type is detected in the video 12 followed by a still motion type that lasts a predetermined length of time, then it may be inferred that the user of the video camera 210 intended to zoom in and record an object of interest, e.g. a person's face in a group scene.

Figure 8:
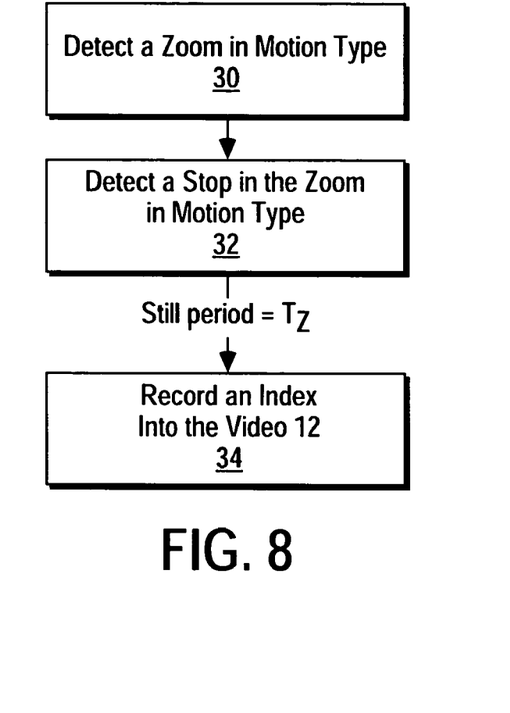
FIG. 8 shows an embodiment of a method for determining an intent to acquire a close up of an object of interest.

FIG. 8 shows an embodiment of a method for determining an intent to acquire a close up of an object of interest. At step 30, the processor 214 detects a zoom in motion type in the video 12. At step 32, the processor 214 waits until the zoom in motion type stops and then detects a still motion type in the video 12. If a still motion type is maintained for a predetermined period of time (Tz) then at step 34 the processor 214 records an index to a video frame of the video 12 into the key frame store 220.

The index recorded at step 34 corresponds to a video frame within the time period $T_Z$. The processor 214 may then obtain a video frame from the video store 212 using the index from at step 34 and then use the obtained video frame to generate a photographic output or a thumbnail output.

The processor 214 may determine an intent by a user of the video camera 210 to acquire a moving object by detecting an object motion type in the video 12 having a duration $T_o$. The period $T_o$ may be bounded by an initial video frame ($F_{io}$) and a final video frame ($F_{fo}$) in the video 12. The processor 214 may record indices into the video 12 corresponding to the video frames $F_{io}$ and $F_{fo}$ into the key frame store 220. The processor 214 may then use the recorded indices for the video frames $F_{io}$ and $F_{fo}$ to generate a flipbook output or a slideshow output. For example, the processor 214 may use the video frames $F_{io}$ and $F_{fo}$ as well as one or more of the intervening video frames between the video frames $F_{io}$ and $F_{fo}$ to generate photographs for a flipbook. The flipbook photographs may be printed on the printer 218. Alternatively, the processor 214 may use the video frames $F_{io}$ and $F_{fo}$ as well as one or more of the intervening video frames between the video frames $F_{io}$ and $F_{fo}$ to generate a slideshow output on the display 216.

Figure 9:
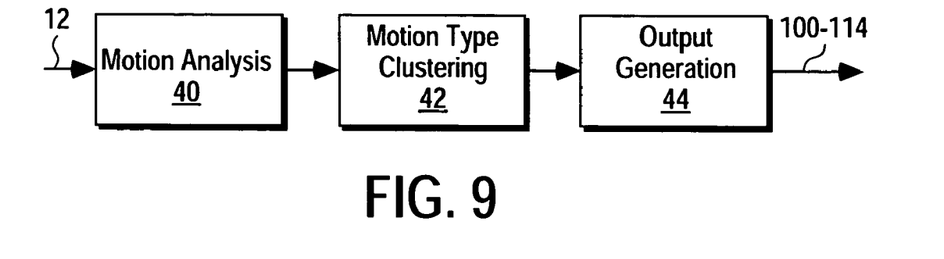
FIG. 9 shows a method for repurposing a video by generating multiple visual outputs that indicate the content of the video.

FIG. 9 shows a method for repurposing the video 12 by generating multiple visual outputs that indicate the content of the video 12. The processor 214 performs a motion analysis step 40 on the video 12, followed by a motion type clustering step 42 on the results of the motion analysis step 40, followed by an output generation step 44 in response to the motion type clustering step 42.

In the motion analysis step 40, the processor 214 analyzes the relative motion between adjacent video frames in the video 12 to detect motion types. The motion analysis step 40 may detect any combination of panning motion types, zoom in motion types, zoom out motion types, object motion types, still motion types, and complex motion types in the video 12.

Figure 10:
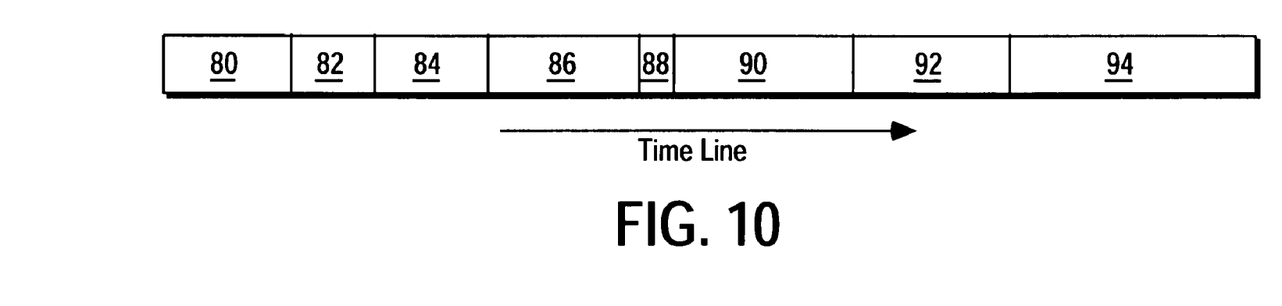
FIG. 10 illustrates a motion type clustering step.

FIG. 10 illustrates the motion type clustering step 42. In the motion type clustering step 42, the processor 214 subdivides the video 12 into a set of segments 80-94 each segment corresponding to a cluster of video frames having the same motion type. For example, the segment 80 is a sequence of video frames of the video 12 having a panning motion type and the segment 82 is a sequence of video frames of the video 12 having an object motion type. The segment 84 has a zoom in motion type, the segment 86 has an object motion type, the segment 88 has a still motion type, the segment 90 has a complex motion type, the segment 92 has a panning motion type, and the segment 94 has a zoom in motion type.

Figure 11:
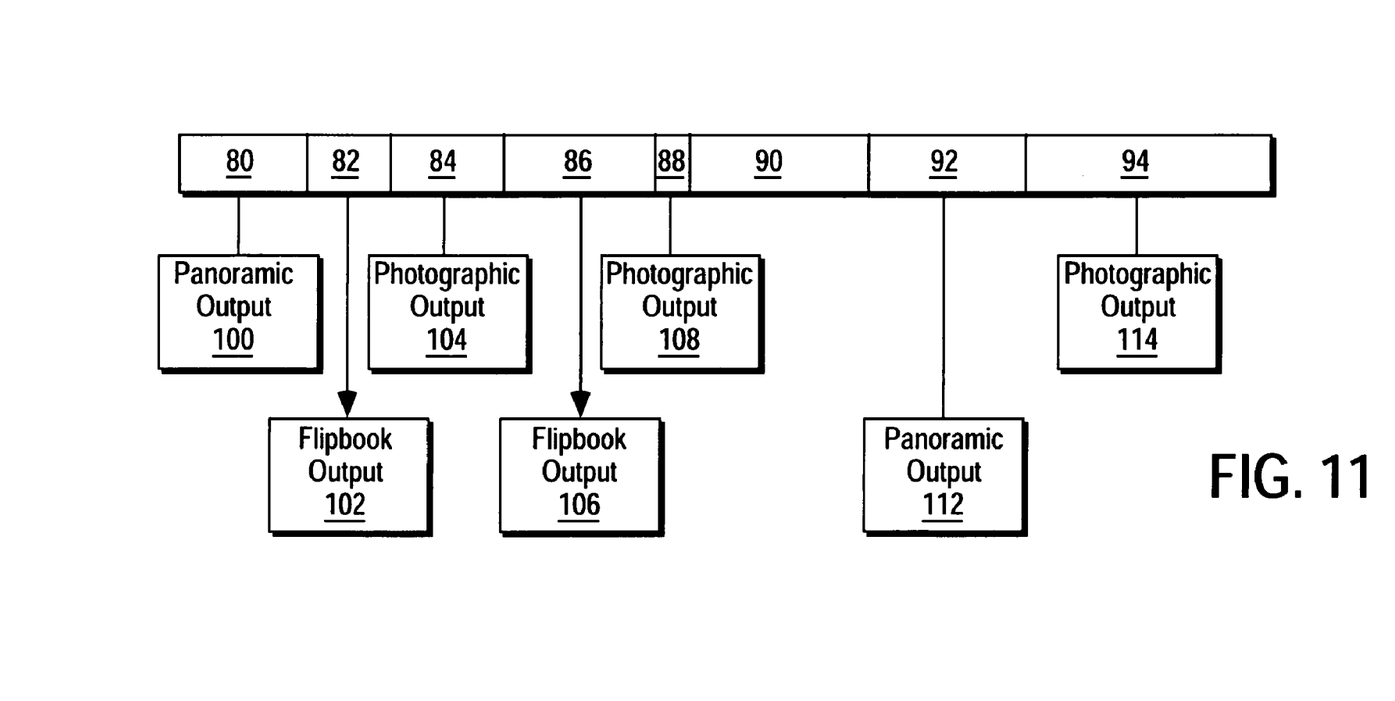
FIG. 11 shows a set of visual outputs generated for a set of example segments.

FIG. 11 shows a set of visual outputs 100-114 generated at the output generation step 44 for the example segments 80-94 of the video 12. The processor 214 generates the visual outputs 100-114 in response to the motion types assigned to the segments 80-94.

The processor 214 generates a panoramic output 100 for the segment 80 at the output generation step 44 because the segment 80 has the panning motion type. The processor 214 also records indices to a set of video frames for the panoramic output 100 into the key frame store 220. Similarly, the processor 214 generates a panoramic output 112 for the segment 92 at the output generation step 44 because the segment 92 is the panning motion type and records indices for the panoramic output 112 into the key frame store 220.

The processor 214 generates a flipbook output 102 for the segment 82 at the output generation step 44 because the segment 82 is of the object motion type. The flipbook output 102 includes a set of photographs derived from a set of video frames in the segment 82. The photographs for the flipbook output 102 may be enhanced over and above the resolution of a video frame. The processor 214 records indices to the video frames used to generate the photographs of the flipbook output 102 into the key frame store 220. Similarly, the processor 214 generates a flipbook output 106 for the segment 86 at the output generation step 44 because the segment 86 is of the object motion type and records indices for the flipbook output 106 into the key frame store 220.

The processor 214 generates a photographic output 104 for the segment 84 at the output generation step 44 because the segment 84 is of the zoom in motion type. The photographic output 104 is derived from a video frame in the segment 84, e.g. a video frame indexed at step 34 above. The processor 214 may perform a resolution enhancement step to increase the resolution of the relevant video frame when generating the photographic output 104. The processor 214 records an index to the video frame used to construct the photographic output 104 into the key frame store 220. Similarly, the processor 214 generates a photographic output 114 for the segment 94 at the output generation step 44 because the segment 94 is of the zoom in motion type and records an index for the photographic output 114 into the key frame store 220.

The processor 214 generates a photographic output 108 for the segment 88 at the output generation step 44 because the segment 88 is of the still motion type. The photographic output 108 is based on a video frame in the segment 88. The processor 214 records an index to the video frame used to construct the photographic output 108 into the key frame store 220. An enhancement step may be performed to increase the resolution of the video frame when generating the photographic output 108.

Figure 12:
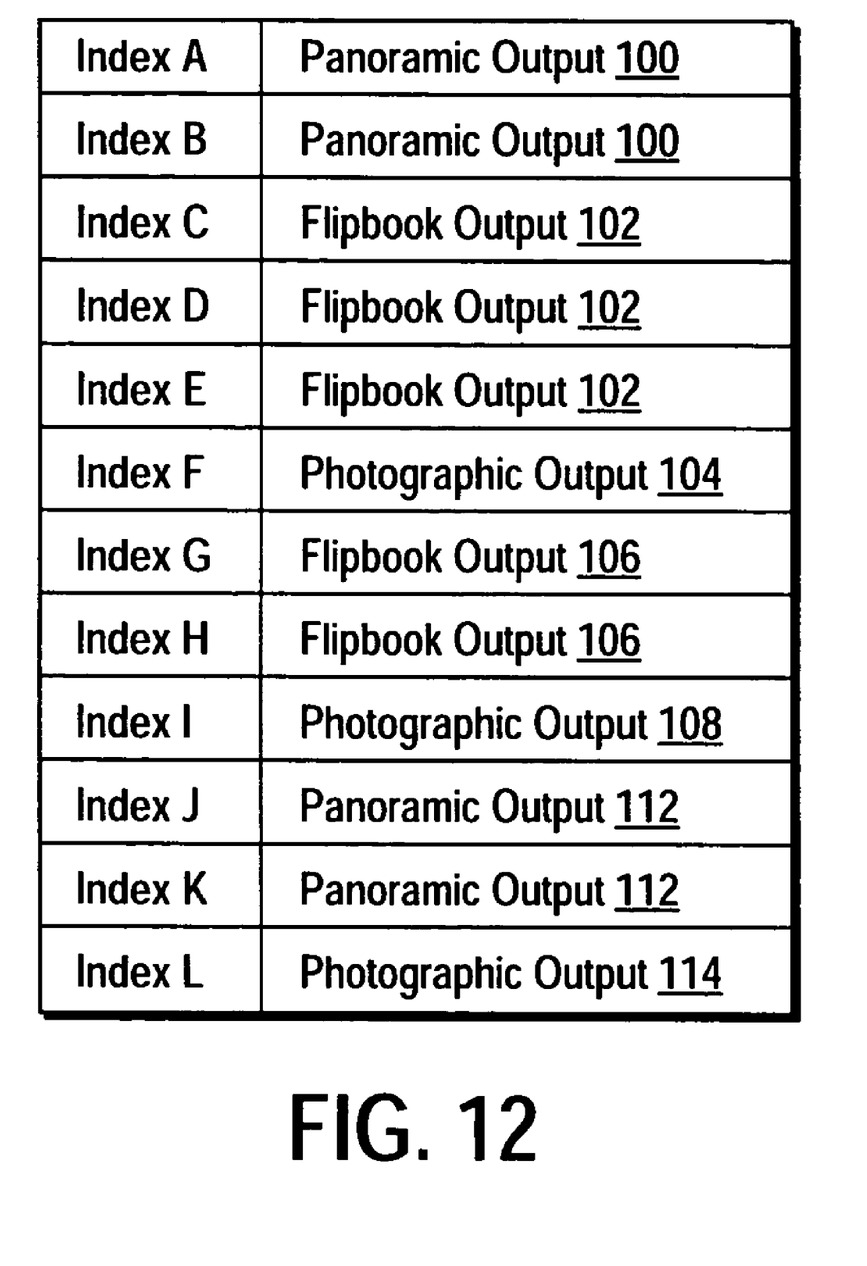
FIG. 12 illustrates the contents of a key frame store for an example set of visual outputs.

FIG. 12 illustrates the contents of the key frame store 220 for the example segments 80-94 of the video 12. The indices (INDEX A through INDEX L) are pointers to corresponding video frames in the video 12 that are stored in the video store 212. The key frame store 220 associates the indices INDEX A through the INDEX L with the corresponding visual outputs 100-112. The processor 214 may use key frame store 220 to provide a user interface that enables a user to browse the significant content of the video 12.

For example, the processor 214 may generate a user interface by rendering the visual outputs 100-114 and generating a selection option that enables a user to individually select the rendered visual outputs 100-114. In response to a user selection of the panoramic output 100, the processor 214 obtains the INDEX A and the INDEX B from the key frame store 220. The INDEX A points to the frame $F_i$ in the panoramic output 100 and INDEX B points to the video frame $F_f$ in the panoramic output 100. The processor 214 may use the obtained pointers to replay the video 12 at the segment that contains the panoramic output 100, i.e. the segment 80. Similarly, in response to the user selection of the photographic output 108, the processor 214 obtains the INDEX I from the key frame store 220 and replays the video 12 at that point in the video 12.

The methods disclosed above may be employed in any system that may generate, obtain, or store a video. Examples include computer systems, digital cameras, video appliances, e.g. video recorder/player, home video equipment, etc. For example, alternative mechanisms for acquiring a video that may be repurposed include mechanisms for reading recorded videos and mechanisms for obtaining videos via a communication network, e.g. Internet.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A method for repurposing a video to reflect a likely intent of a user of a camera that acquired the video, comprising:
    detecting, by a processor, a sequence and timing of motions of the camera that indicate the likely intent of the user, wherein detecting the sequence and timing includes detecting an object motion having a timing that indicates an intent to capture a moving object;
    generating, by the processor, a visual output having a first form selected from plural forms, wherein the first form is selected in response to the sequence and timing indicating a particular intent of the user, wherein the visual output having the first form contains plural frames of the video, and wherein the plural frames selected to be included in the visual output having the first form are frames containing content reflecting the particular intent of the user of the camera, wherein generating the visual output having the first form includes generating a flipbook output or slideshow output that depicts the moving object, wherein the flipbook output or slideshow output contains the plural frames that each includes the moving object.

2. The method of claim 1, further comprising detecting a zoom in motion followed by a still motion having a timing that indicates an intent to capture a close up of an object of interest.

3. The method of claim 2, further comprising generating a visual output having a second of the plural forms, wherein the visual output having the second form is a photographic output that includes the close up.

4. The method of claim 1, further comprising detecting a panning motion followed by a still motion having a timing that indicates an intent to capture an object of interest.

5. The method of claim 4, further comprising generating a visual output having a second of the plural forms, wherein the visual output having the second form is a photographic output that includes the object of interest.

6. The method of claim 1, further comprising detecting a panning motion having a timing that indicates an intent to capture a panorama.

7. The method of claim 6, further comprising generating a visual output having a second of the plural forms, wherein the visual output having the second form includes a panoramic output that includes the panorama, wherein the panoramic output includes plural frames stitched together.

8. The method of claim 7, wherein detecting the panning motion having the timing that indicates the intent to capture the panorama comprises detecting the panning motion having the timing between a first frame and a second frame, wherein the panoramic output contains the first frame and second frame and one or more other frames between the first and second frames, wherein the first and second frames and one or more other frames are stitched together.

9. The method of claim 1, further comprising generating an index for each of a set of key frames in the video that correspond to the visual output and storing the indices.

10. The method of claim 9, further comprising browsing the video using the indices.

11. A method for repurposing a video to reflect a likely intent of a user of a camera that acquired the video, comprising:
    detecting, by a processor, a sequence and timing of motions of the camera that indicate the likely intent of the user;
    generating, by the processor, a visual output having a first form selected from plural forms, wherein the first form is selected in response to the sequence and timing indicating a particular intent of the user, wherein the visual output having the first form contains plural frames of the video, and wherein the plural frames selected to be included in the visual output having the first form are frames containing content reflecting the particular intent of the user of the camera, wherein detecting the sequence and timing comprises detecting a panning motion having a timing that indicates an intent to capture a panorama, wherein generating the visual output having the first form includes generating a panoramic output that includes the panorama, wherein the panoramic output includes the plural frames stitched together;
    detecting an object motion in the video that indicates an intent to capture a moving object; and
    generating another visual output having a second of the plural forms that includes a flipbook output or a slideshow output that depicts the moving object, wherein the flipbook output or slideshow output contains plural frames that each includes the moving object.

12. A video system, comprising:
    a camera for acquiring a video;
    a visual output device; and a processor to detect a sequence and timing of motions of the camera that indicate a likely intent of a user that acquired the video and to generate a visual output on the visual output device having a first form selected from plural forms, wherein the first form is selected in response to the sequence and timing indicating a particular intent of the user, wherein the visual output having the first form contains plural frames of the video, and wherein the plural frames selected to be included in the visual output having the first form are frames containing content reflecting the particular intent of the user of the camera, wherein the sequence and timing comprise an object motion having a timing that indicates an intent to capture a moving object and the visual output having the first form is a flipbook output or slideshow output that contains the plural frames each containing the moving object.

13. The video system of claim 12, further comprising a key frame store that holds an index into the video that corresponds to the visual output.

14. The video system of claim 13, wherein the processor is configured to generate a user interface that enables a user to browse the video using the index.

15. The video system of claim 12, wherein the visual output is a hard copy output.

16. A video system, comprising:
a camera for acquiring a video;
a visual output device; and
a processor to detect a sequence and timing of motions of the camera that indicate a likely intent of a user that acquired the video and to generate a visual output on the visual output device having a first form selected from plural forms, wherein the first form is selected in response to the sequence and timing indicating a particular intent of the user, wherein the visual output having the first form contains plural frames of the video, and wherein the plural frames selected to be included in the visual output having the first form are frames containing content reflecting the particular intent of the user of the camera, wherein the processor is to further detect an object motion in the video that indicates an intent to capture a moving object, and the processor is configured to, in response to detecting the object motion, generate another visual output having a second of the plural forms that includes a flipbook output or a slideshow output that contains plural frames each containing the moving object.

17. The video system of claim 16, wherein the sequence and timing comprise a panning motion having a timing that indicates an intent to capture a panorama and the visual output having the first form is a panoramic output that includes the plural frames stitched together.

18. The video system of claim 17, wherein the panning motion having the timing that indicates the intent to capture the panorama is a panning motion between a first frame and a second frame, and wherein the panoramic output contains the first frame and the second frame and one or more other frames between the first and second frames, wherein the first and second frames and one or more other frames are stitched together.

19. The video system of claim 16, wherein the sequence and timing comprise a panning motion followed by a still motion having a timing that indicates an intent to capture an object of interest and the processor is configured to, in response to the sequence and timing indicating the intent to capture the object of interest, generate a visual output having a second of the plural forms, wherein the visual output having the second form is a photographic output containing the object of interest.

20. The video system of claim 16, wherein the sequence and timing comprise a zoom in motion followed by a still motion having a timing that indicates an intent to capture a close up and the processor is configured to, in response to the sequence and timing indicating the intent to capture the close up, generate a visual output having a second of the plural forms, wherein the visual output having the second form is a photographic output containing the close up.

21. A system comprising:
a video store to store video captured by a camera; and
a processor to detect a sequence and timing of motions of the camera that indicate a likely intent of a user that acquired the video and to generate a visual output on the visual output device having a first form selected from plural forms, wherein the first form is selected in response to the sequence and timing indicating a particular intent of the user, wherein the visual output having the first form contains plural frames of the video, and wherein the plural frames selected to be included in the visual output having the first form are frames containing content reflecting the particular intent of the user of the camera, wherein the sequence and timing comprise an object motion having a timing that indicates an intent to capture a moving object and the visual output having the first form is a flipbook or slideshow output that contains the plural frames each containing the moving object.

* * * * *